June 8, 1926.
H. H. THOMPSON
1,587,806
FEEDING AND ROTATING MEANS FOR ELECTRODES
Filed March 26, 1918   2 Sheets-Sheet 1
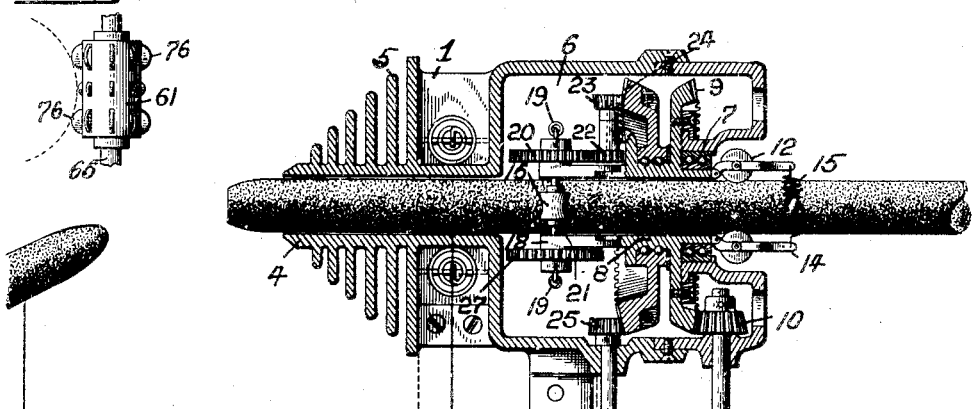
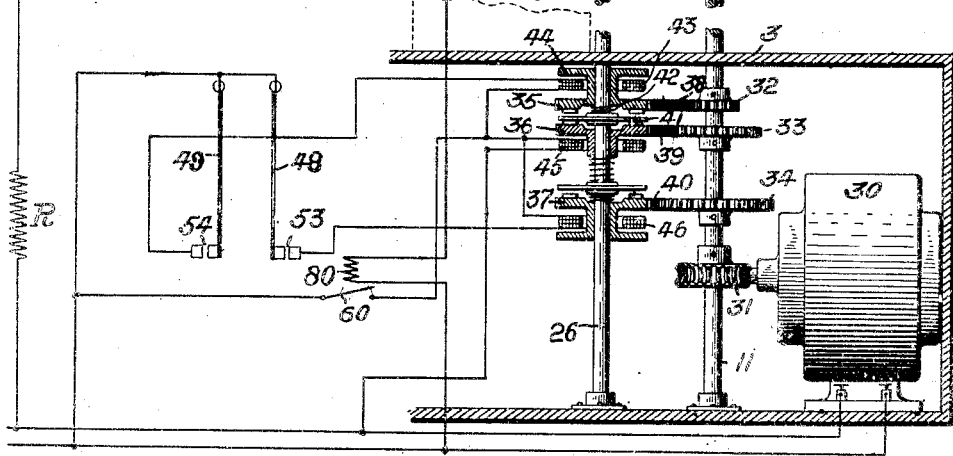
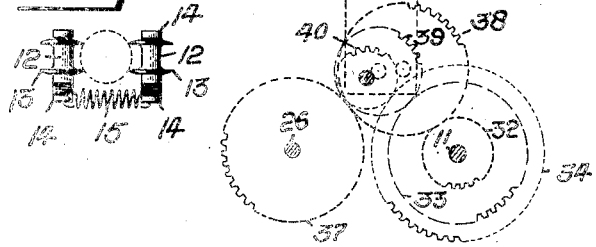
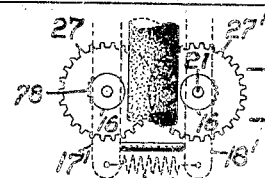
INVENTOR
Herbert H. Thompson June 8, 1926.
H. H. THOMPSON
FEEDING AND ROTATING MEANS FOR ELECTRODES
Filed March 26, 1918   2 Sheets-Sheet 2
1,587,806
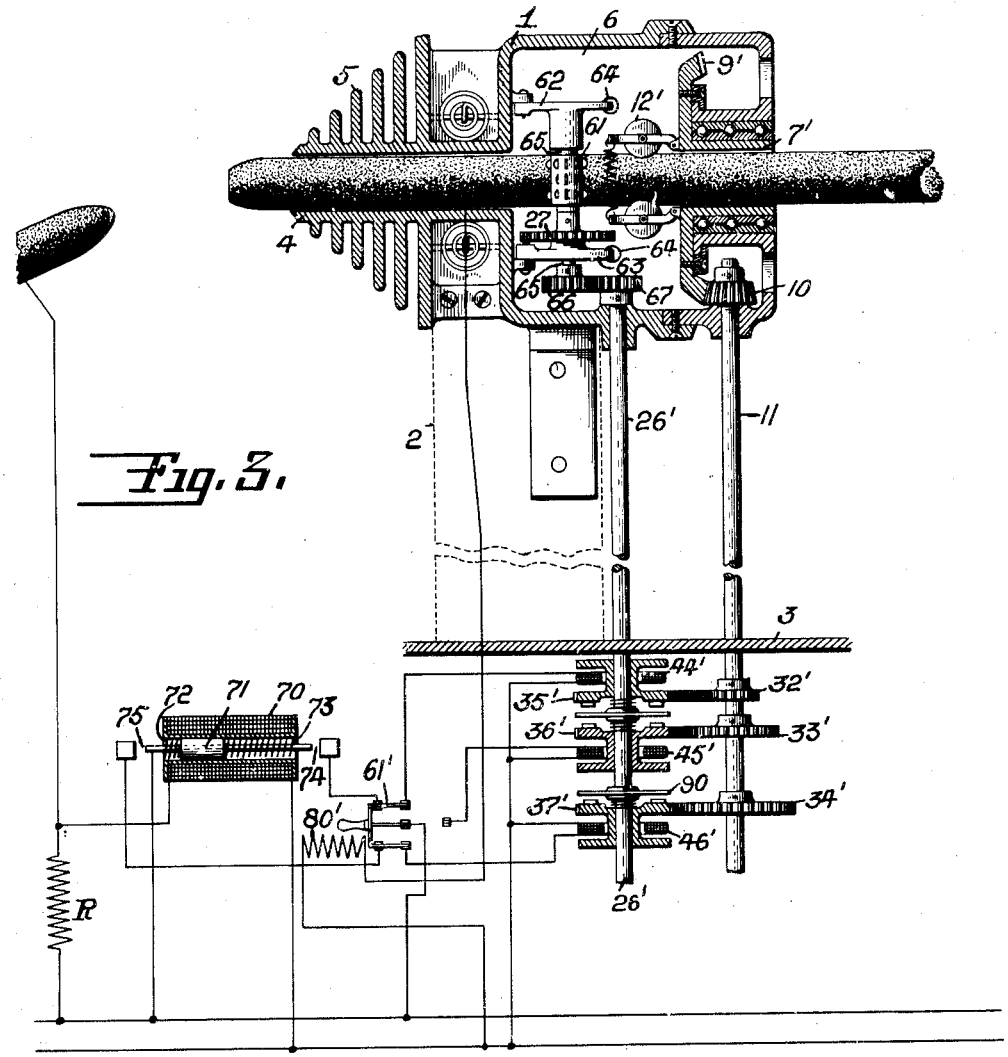
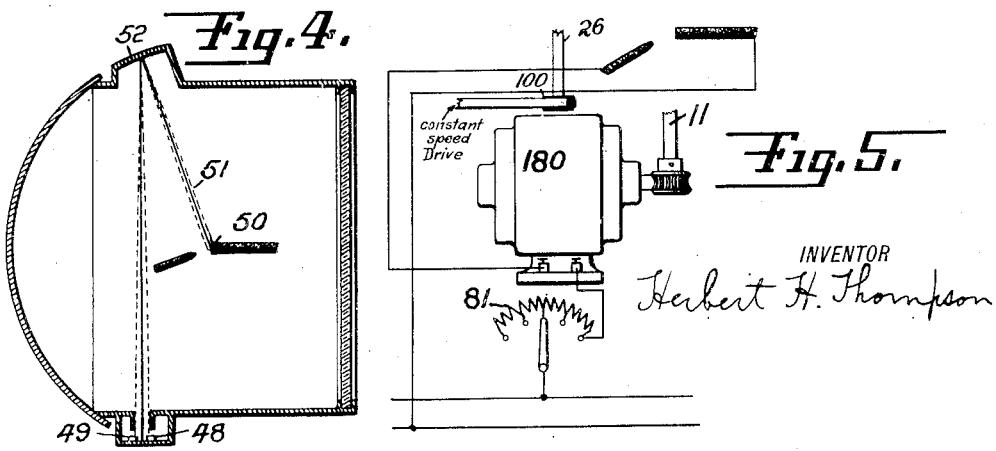
INVENTOR
Herbert H. Thompson Patented June 8, 1926.

1,587,806

UNITED STATES PATENT OFFICE.

HERBERT H. THOMPSON, OF BROOKLYN, NEW YORK, ASSIGNOR TO THE SPERRY GYROSCOPE COMPANY, OF BROOKLYN, NEW YORK, A CORPORATION OF NEW YORK.

FEEDING AND ROTATING MEANS FOR ELECTRODES.

Application filed March 26, 1918. Serial No. 224,916.

This invention relates especially to electrode holders and feeding mechanism for electrodes operating with heavy currents and at high current density such as now employed in the so called "high intensity" flaming arc searchlights. It is found important with such lamps to locate a stationary holder close to the arc and to rotate the electrode within and feed it through the holder. The object of my invention is to improve upon the mechanism for effecting either the rotation or the feed or both of the electrode.

Referring to the drawings in which what I now consider to be the preferred forms of my invention are shown:

Fig. 1 is a vertical section of an electrode holder showing also the control mechanism diagrammatically in the base of the searchlight for rotating and feeding the electrode.

Fig. 1ª is a detail of the rollers used to rotate the electrode.

Fig. 2 is a detail showing a plurality of gears employed between the power shaft and the feed shaft.

Fig. 3 is a view corresponding to Fig. 1 of a modified form of feeding mechanism.

Fig. 4 is a diagram illustrating the manner of operation of the controlling mechanism for the feed.

Fig. 5 is a diagram showing a modified method of actuating the feed shaft shown in Fig. 1.

Fig. 6 shows a feed roller of Fig. 3 on an enlarged scale.

Fig. 7 illustrates a modified roller especially adapted for use in the form of the invention shown in Fig. 3.

As illustrated, the electrode holder 1 is supported on a standard 2 from a control box 3; the drawings representing my invention as applied to an electrode holder for searchlights (not shown.) The control box, it will be understood may be slidably mounted in the base of searchlight drum. The holder is shown as comprising a forward portion 4 having cooling ribs 5 thereon and the rear hollow portion 6 within which is enclosed mechanism for feeding and rotating the electrode. Rotatably mounted in a bearing 7 of said rear portion is a member 8. Said member is shown as provided with bevel gear teeth 9 which mesh with the bevel pinion 10 on a shaft 11. Gripping means such as rollers 12 may be mounted on the member 8 to grip the electrode and cause it to rotate with the member. Said rollers are preferably provided with biting edges 13 (Fig. 1ª) preventing rotary slipping of the electrode, but permitting free axial movement through the rollers. The rollers are shown as mounted on brackets 14 each pivoted to the member 8 and resiliently held together by spring 15 or the like.

In addition to the rollers 12 which cause rotation of the electrode I prefer to employ a separate feed roller or rollers 16. Said rollers are preferably actuated independently of the rotation of the electrode and may or may not be mounted on rotary member 8. In the form shown in Fig. 1 rollers 16 are shown as mounted on brackets 17 and 18 (see Figs. 1 and 7) pivotally mounted on member 8, and pressed together by springs 19. A gear wheel 20 is mounted on the shaft 21 of the roller 16 and meshes with a pinion 22 on the shaft of the bevel pinion 23. Said pinion engages a large bevel gear 24 rotatably mounted on the holder. As shown the bevel gear is journalled upon the hub portion of the member 8 and is rotated from pinion 25 on the feed shaft 26 which engages the outer portion of the broad gear 24. Also mounted on said shaft 21 is shown a gear 27 which meshes with a corresponding gear 27' on the shaft of the other roller 16 (note Fig. 7). Two shafts 11 and 26 are each rotated to effect the rotation and feeding of the electrode, but the relative speed of rotation of the shafts is varied to effect changes in the rate of feed. As shown the shaft 11 is rotated at a comparatively constant speed by means such as motor 30 which drives worm wheel 31 on said shaft. Shaft 26 is shown as driven from the same power means being connected thereto by change speed gears. The change speed mechanism is shown diagrammatically and comprises a plurality of gears 32, 33 and 34 on the shaft 11, said gears driving respective gear clutches 35, 36 and 37 loosely mounted on the shaft 26. Idlers 38, 39 and 40 (see Fig. 2) are introduced between the various gears. Gear clutch 35 is normally held out of engagement with the friction disk 41 secured to shaft 26, by spring 42, but on excitation of the coil 43 the armature 44 is attracted and the gear clutch brought into engagement with the friction disk. Gear clutch 36 on the other hand is normally pressed into engagement with the other side of friction disk 41 thereby driving the same and is drawn out of engagement by coil 45 while gear clutch 37 corresponds in operation to gear clutch 35, being normally out of engagement, but brought into engagement by coil 46. With all coils unexcited therefore disk 41 will be driven by gear 36. Preferably the gears are so laid out that when the shaft 26 is being so driven it will rotate gear 24 at the same speed as the gear 9 is rotated. Under such condition it will be seen that feed rollers 16 will not be rotated on their own axes and will therefore not effect the feed. On the other hand if gear 24 is slowed down slightly a feed of the electrode will be effected; while, if rotated somewhat faster than gear 9, the electrode will be retracted. Furthermore a further variation may be effected by stopping the shaft 26 altogether, which will effect an extremely rapid forward feed. All of these results are shown as effected by the clutch mechanism above described.

Preferably the clutches are controlled by mechanism which is responsive to the position of the arcing face of the electrode in the searchlight. Such mechanism may be in the form of one or more thermostats represented at 48 and 49, each of which is adapted to curl and close or open a circuit upon the searchlight beam striking it. Preferably the thermostats are arranged as indicated in Fig. 4 so that when the crater 50 is in the focus, the beam 51, which is reflected by the curved mirror 52 will strike between the two thermostats 48 and 49, and will not impinge upon either one. If the crater should burn backwardly however the beam will be thrown on thermostat 49. On the other hand, if the crater should become too far advanced it will strike thermostat 48. The closing of the contact 54 by thermostat 49 operates to excite both the coils 43 and 45. This, it will be seen will throw clutch 35 into engagement with disk 41 and at the same time release clutch 36 from contact therewith, thereby driving shaft 26 at a somewhat slower speed. If, however, the electrode becomes too far advanced contact 53 will be closed by thermostat 48, coils 45 and 46 will be excited and a more rapid rotation of shaft 26 effected thereby withdrawing the electrode.

A circuit breaking switch 60 controlled by an electromagnet 80 in series with the arc is shown in circuit with coil 45 to effect a rapid forward feed in the arc in case it is necessary to feed the electrode up rapidly for any reason such as the breaking off of a large piece of the electrode. When this switch, which is normally open, is manually closed it will be seen that coil 45 will be excited and since none of the other coils are excited, the shaft 26 will come to a stop and the electrode fed forward rapidly. Switch 60 may also be used to strike the arc as follows: The closing of the switch will cause a rapid forward feed of the electrode, as stated. As soon, however, as the electrodes touch, electromagnetic coil 80 which is responsive to high current flowing at such times only will become excited and open the switch, if the operator's hand be removed, allowing the thermostat to cause the arc to draw to the proper position.

In Fig. 3 I have illustrated the feed rollers as mounted independently of the rotating means. In this figure the rotatable member 7' is provided with gripping disks 12' as before and also with a bevel gear 9' meshing with gear 10. The feed rollers 61 are rotatably mounted on brackets 62, 63 pivoted directly to the holder 1, and pressed together by springs 64. On the shaft 65 of roller 61 is shown a gear 66 which meshes with a pinion 67 on the feed shaft 26'. Gears 27 and 27' are provided as before to rotate one roller from the other. Shaft 11 is again represented as continuously driven and provided with a plurality of gears 32', 33' and 34'; while mounted on shaft 26' are the gear clutches 35', 36' and 37'. In this instance however shaft 26' is normally stationary when no feeding is taking place so that all of the gears are normally held away from the friction disks and are pressed toward the disk by excitation of the windings 44', 45' or 46'. Said windings instead of being controlled by a thermostat are represented as controlled by solenoid 70 which may be placed across the arc so as to be responsive to the changes in voltage across the arc. The movable core 71 of the solenoid is shown as yieldingly held by springs 72 and 73 to one side of its central position. It will be readily seen that with a proper design of solenoid an increase in arc length— or in other words, an increase in voltage drop across the arc, would cause an increase of the strength of the shunt coil 70 and cause core 71 to move to the right thereby closing the contacts 74, while on the other hand a decrease in arc length will cause the closing of contact 75. Contacts 74 are in circuit with the coil 44' on the gear clutch 35', which is designed to effect the feed of the electrode at a rate somewhat greater than necessary to compensate for normal consumption. Contact 75 on the other hand, is in circuit with coil 46' on gear clutch 37'. Said gear is driven in the opposite direction to gears 35' and 36', there being no idler shown between the gears 37' and 34', so that when it is thrown into contact with friction disk 90 shaft 26 will be driven in the direction to withdraw the electrode.

I may again provide a hand switch 61' to effect a rapid feed of the electrode as before. The switch 61' when thrown away from the position shown in Fig. 3 breaks the circuit between coils 44' and 46' and the contacts 74 and 75, respectively and completes a circuit to coil 45'. In striking the arc, as soon as the electrodes touch electromagnet 80' will return the switch to its normal position. Since the arc is very short at this time, switch 75 will immediately close, causing a rapid retraction of the electrode to the proper arc length.

Since rollers 61 do not, according to this modification, rotate with the electrode, I may equip the rollers with small rotatable disks or rollers 76 which turn on axes perpendicular to the axis of the main roller (see Fig. 6.) By this means it will be seen that the sliding friction between the rotating electrode and the roller is largely eliminated and at the same time the effectiveness of the feeding not impaired. The disks 76 near the center of the roller may be of smaller diameter than those nearer the edges to fit the periphery of the electrode.

A modified method of constructing the roller 61 is shown in Fig. 7. According to this method the rollers are provided with teeth or serrations 78 which extend over only a small portion of their periphery. It will be seen when the smooth portion of the roller is above or adjacent the electrode that very little or no friction will take place between the electrode and roller, while during the short time the serrations are in engagement with the electrode it will be pushed forwardly—the feed being in this method step-by-step. While serrations 78 need not be so designed as to stop or retard the rotation of the electrode while in engagement therewith, it may be remarked that no harm would be done by stopping the rotation for a short period at intervals.

Instead of driving the feed shaft 26 or 26' by the same power means that the shaft 11 is driven from, I may provide an independent means for the feed. Also it is obvious that shaft 11 may be driven at a variable speed instead of shaft 26, the latter being driven by a constant speed motor. In Fig. 5 is illustrated a simple means as applied to the form of the invention shown in Fig. 1, for controlling such an independent driving means, and for driving shaft 11 at a variable speed, said means being illustrated as a motor 180. Said motor is preferably of a shunt or compound type, being designed to have a speed in direct proportion to the current flowing therethrough and is so designed that under normal or arc voltage it will drive the shaft 11 at approximately the same speed that shaft 26 is driven. In this figure shaft 26 is represented as driven by a constant speed drive 100. The motor is shown as connected in series with the arc so that if the arc length becomes too long the motor 180 will slow down thereby effecting the forward feed as explained. If the arc becomes too short the motor will accelerate, thereby increasing the arc length. In order to adjust the arc length a hand rheostat 81 may be provided to regulate the voltage of the motor and arc.

While I have only discussed my feeding means as applied to one electrode, it will be understood that the other electrode is also preferably fed at the required rate by any suitable mechanism.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with an electrode holder, of a rotatable member journaled thereon, means on said member for gripping the electrode to rotate the same, and a feed roller adapted to engage the electrode at a point spaced from said rotating gripping means.

2. The combination with an electrode holder, of a feed roller mounted thereon for feeding the electrode through the holder, and means independent of said roller for rotating the electrode within the holder.

3. The combination with an electrode holder, of a rotatable member journaled thereon, means on said member for gripping the electrode to rotate the same, a feed roller mounted on said member, a second rotatable member, means to rotate said members continuously and normally independently of each other about their axes at differential speeds, and means controlled by the relative speeds of said members for actuating said feed roller.

4. The combination with an electrode holder, of a gear rotatably mounted thereon, a second gear mounted thereon for rotation normally independent of the first gear, means responsive to the position of one end of the arc for rotating said gears at variable speeds, and mechanism actuated by such variation for feeding the electrode.

5. The combination with an electrode holder, of a gear rotatably mounted thereon, a second gear mounted thereon for normally independent rotation, means whereby one of said gears rotates the electrode, means responsive to the position of the electrode tip for rotating said gears at variable speeds, and mechanism actuated by such variation for feeding the electrode.

6. In an arc lamp, rotatable means for rotating an electrode, a second rotatable means, means for driving one of said rotatable means at a constant speed, a second driving means for driving the other rotatable means normally independently of said first rotatable means, means responsive to the position of one end of the arc for varying the speed of said second driving means and feeding means brought into operation by such speed variation for altering the relative speeds of said two rotatable means.

7. In an arc striking device, an electrode holder, means for moving the electrode therethrough in either direction, means whereby said first means is controlled by the arc, manual means for causing a forward feed independently of said other means, and means responsive to current flow on contact of the electrodes for throwing out said last named means.

8. In a searchlight, the combination with a positive electrode, of power means for continuously rotating the same and means for maintaining the arcing end thereof in a predetermined position in the light comprising actuating means and a plurality of contacts actuated thereby, one of which is actuated when said end lies back of said position while another is actuated when said end lies forward of said position and means responsive thereto for causing said power means to feed and retract the electrode during the continuous rotation thereof.

9. The combination with an electrode holder, of means for rotating and means for feeding the electrode including a rotatable member, means whereby the rate of feed is varied by altering the relative speeds of rotation of the electrode and said member, and automatic means responsive to the position of one end of the arc for altering said relative speeds of rotation.

10. In an arc lamp, a rotatable means for rotating an electrode, means for feeding the electrode including a rotatable member, means whereby the rate of feed is dependent upon the relative speeds of rotation of said electrode and said member, and means responsive to the position of the arcing end of the positive electrode for varying said relative speeds.

11. In an arc lamp, a rotatable means for rotating an electrode, a second means rotatable about its axis normally independently of said first means for feeding the electrode, a common power means for continuously rotating said first two means, a variable speed device for actuating said second means from said power means, and means responsive to the position of the arc end of said electrode for altering the driving speed of said device.

12. In a searchlight, the combination with an electrode holder, of a rotatable member journalled thereon, means for rotating the same, a second member, means for rotating said second member normally independently of said first member, a feed roller mounted for revolution with one of said members and for rotation on its own axis, means responsive to the position of the electrode tip for retarding the rotation of said second member, and means actuated by such retardation for continuously rotating said feed roller on its own axis.

13. In a searchlight, the combination with an electrode holder, of a rotatable member journalled thereon, means for rotating said member, a second member, means for rotating said second member normally independently of said first member, means responsive to the position of the electrode tip for altering the rotation of said second member, and means actuated by such alteration for feeding an electrode through said holder.

14. In a searchlight, the combination with an electrode holder, of a rotatable member journalled thereon, means for rotating the same, a second rotatable member concentric with said first member and journalled thereon, means for rotating said second member normally independently of said first member, a feed roller mounted for revolution with one of said members and for rotation on its own axis, means responsive to the position of the electrode tip for retarding the rotation of said second member, and means actuated by such retardation for continuously rotating said feed roller on its own axis.

15. In a searchlight, the combination with an electrode holder, of a rotatable member journalled thereon, means for rotating the same, a second rotatable member concentric with said first member and journalled thereon, means for rotating said second member normally independently of said first member, means responsive to the position of the electrode tip for altering the rotation of said second member, and means actuated by such alteration for feeding an electrode through said holder.

16. In a projector mechanism, the combination with an electrode holder, of a pair of relatively rotatable members mounted thereon and independently rotatable, means for continuously rotating said members normally independently of each other, electrode gripping means mounted on one of said members to revolve therewith, means whereby the relative speeds of said members may be varied, and means brought into action by such variation for causing said gripping means to feed the electrode.

17. In a projector mechanism, the combination with an electrode holder, of a pair of rotatable members mounted thereon and independently rotatable, means for continuously rotating said members normally independently of each other, electrode gripping means mounted on one of said members to revolve therewith, means connecting said gripping means and said other member to operate said gripping means to feed the electrode, said means being normally inoperative as long as said members revolve together, and means whereby the relative speeds of said members may be varied.

18. In a projector mechanism, the combination with an electrode holder, of a pair of rotatable members mounted thereon and independently rotatable, means for continuously rotating said members normally independently of each other, electrode gripping means mounted on one of said members to revolve therewith, means responsive to the position of one end of the arc for varying the relative speeds of said members, and means brought into action by such variation for causing said gripping means to feed the electrode.

19. In a projector mechanism, the combination with an electrode holder, of a pair of rotatable members mounted thereon and independently rotatable, means for continuously rotating said members normally independently of each other, electrode gripping means mounted on one of said members to revolve therewith, means connecting said gripping means and said other member to operate said gripping means to feed the electrode, said means being normally inoperative as long as said members revolve together, and means for varying the relative speeds of said members.

20. In a feeding mechanism for arc lights, the combination with an electrode holder, of a gear journalled therein and having an aperture therethrough adapted to receive an electrode, means for continuously rotating said gear, an electrode feeding device secured to an extension on said gear, a member rotatably mounted on said extension between said gear and said feeding device, means for continuously rotating said member normally independently of said gear, variable means driven by said first named means for imparting a variable rotation to said member, and mechanism connecting said member and feeding device for feeding said electrode on variation in relative speed of said gear and member.

In testimony whereof I have affixed my signature.

HERBERT H. THOMPSON.